United States Patent
Witczak et al.

(10) Patent No.: US 10,910,903 B2
(45) Date of Patent: Feb. 2, 2021

(54) DUAL ROTOR, CORELESS, ELECTROMAGNETIC MACHINE

(71) Applicant: CARRIER CORPORATION, Palm Beach Gardens, FL (US)

(72) Inventors: Tadeusz Pawel Witczak, Farmington, CT (US); Cezary Jedryczka, Lniano (PL); Wojciech Szelag, Poznan (PL); Stella M. Oggianu, Farmington, CT (US); Zbigniew Piech, Cheshire, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/247,458

(22) Filed: Jan. 14, 2019

(65) Prior Publication Data
US 2019/0222085 A1    Jul. 18, 2019

Related U.S. Application Data

(60) Provisional application No. 62/616,496, filed on Jan. 12, 2018.

(51) Int. Cl.
*H02K 16/02* (2006.01)
*H02K 21/12* (2006.01)
(Continued)

(52) U.S. Cl.
CPC .......... *H02K 3/47* (2013.01); *H02K 1/20* (2013.01); *H02K 1/32* (2013.01); *H02K 3/24* (2013.01); *H02K 3/26* (2013.01); *H02K 3/32* (2013.01); *H02K 7/14* (2013.01); *H02K 9/06* (2013.01); *H02K 11/33* (2016.01); *H02K 15/045* (2013.01);
(Continued)

(58) Field of Classification Search
CPC ............ H02K 16/02; H02K 3/52; H02K 5/16; H02K 1/22; H02K 15/065; H02K 21/46
USPC .... 310/65, 156.26, 179, 216.005, 265, 75 R, 310/98, 191
See application file for complete search history.

(56) References Cited

U.S. PATENT DOCUMENTS

| 5,331,244 A | * | 7/1994 | Rabe | H02K 3/04 |
| | | | | 310/114 |
| 5,373,207 A | * | 12/1994 | Yamaguchi | H02K 7/063 |
| | | | | 310/40 MM |

(Continued)

FOREIGN PATENT DOCUMENTS

| CN | 1707921 A | 12/2005 |
| CN | 101997371 A * | 3/2011 |

(Continued)

OTHER PUBLICATIONS

Machine Translation CN101997371 (Year: 2011).*
(Continued)

*Primary Examiner* — Jose A Gonzalez Quinones
(74) *Attorney, Agent, or Firm* — Cantor Colburn LLP

(57) ABSTRACT

A coreless electromagnetic machine includes a dual rotor and a stator. The dual rotor is adapted to rotate about an axis, and includes inner and outer rotor segments. The outer rotor segment is spaced radially outward from, and axially aligned to, the inner rotor segment. The inner and outer rotor segments radially define an annular chamber. The stator is disposed, at least in-part, in the annular chamber.

16 Claims, 10 Drawing Sheets

(51) Int. Cl.
*H02K 7/14* (2006.01)
*H02K 15/04* (2006.01)
*H02K 1/20* (2006.01)
*H02K 9/06* (2006.01)
*H02K 1/32* (2006.01)
*H02K 3/47* (2006.01)
*H02K 3/24* (2006.01)
*H02K 3/26* (2006.01)
*H02K 3/32* (2006.01)
*H02K 11/33* (2016.01)
*H02P 6/08* (2016.01)

(52) U.S. Cl.
CPC ............ *H02K 16/02* (2013.01); *H02K 21/12* (2013.01); *H02P 6/08* (2013.01); *H02K 2203/03* (2013.01); *H02K 2203/12* (2013.01); *H02K 2211/03* (2013.01)

(56) References Cited

U.S. PATENT DOCUMENTS

| | | | |
|---|---|---|---|
| 5,723,933 A | 3/1998 | Grundl et al. | |
| 6,873,085 B2 | 3/2005 | Graham et al. | |
| 6,924,574 B2 | 8/2005 | Qu et al. | |
| 6,998,757 B2 | 2/2006 | Seguchi et al. | |
| 7,154,192 B2 * | 12/2006 | Jansen | H02K 1/06 |
| | | | 290/55 |
| 7,557,486 B2 | 7/2009 | Choi et al. | |
| 7,888,839 B2 | 2/2011 | Gabrys et al. | |
| 7,911,110 B2 | 3/2011 | Choi et al. | |
| 7,990,019 B2 | 8/2011 | Sung | |
| 8,053,946 B2 | 11/2011 | Koizumi et al. | |
| 8,207,648 B2 | 6/2012 | Li et al. | |
| 8,466,592 B2 | 6/2013 | Atallah et al. | |
| 8,736,126 B2 | 5/2014 | Konecny et al. | |
| 8,754,568 B2 | 6/2014 | Kim et al. | |
| 8,796,895 B2 | 8/2014 | Choi et al. | |
| 8,987,962 B2 | 3/2015 | Kim | |
| 9,018,819 B2 * | 4/2015 | Gerfast | H02K 3/47 |
| | | | 310/179 |
| 9,203,279 B2 | 12/2015 | McMullen | |
| 9,496,768 B2 | 11/2016 | Rens et al. | |
| 9,537,362 B2 | 1/2017 | Jansen et al. | |
| 9,644,305 B2 | 5/2017 | Kim | |
| 9,712,028 B2 | 7/2017 | Kim et al. | |
| 9,799,434 B2 * | 10/2017 | Murase | H01F 6/02 |
| 2004/0174082 A1 | 9/2004 | Graham | |
| 2009/0091204 A1 | 4/2009 | Koshiba et al. | |
| 2012/0133221 A1 * | 5/2012 | Leiber | H02K 1/20 |
| | | | 310/54 |
| 2012/0169063 A1 | 6/2012 | Stegmann et al. | |
| 2013/0249344 A1 * | 9/2013 | Folmli | H02K 3/00 |
| | | | 310/184 |
| 2014/0070651 A1 | 3/2014 | Gerfast | |
| 2015/0270754 A1 | 9/2015 | Kusase | |
| 2015/0381006 A1 * | 12/2015 | Allen | H02K 1/148 |
| | | | 417/423.7 |
| 2016/0376741 A1 | 12/2016 | Kim et al. | |
| 2017/0104398 A1 | 4/2017 | Peng et al. | |
| 2017/0187258 A1 * | 6/2017 | Fujikawa | H01F 7/02 |
| 2017/0288489 A1 | 10/2017 | Shiraki et al. | |

FOREIGN PATENT DOCUMENTS

| | | | | |
|---|---|---|---|---|
| CN | 101783557 B | 3/2012 | | |
| CN | 101997371 A | 10/2013 | | |
| CN | 203416139 U | 1/2014 | | |
| CN | 103683769 B | 12/2015 | | |
| CN | 103414301 B | 5/2016 | | |
| CN | 105763008 A | 7/2016 | | |
| CN | 107171524 A | 9/2017 | | |
| DE | 10033577 A1 | 4/2001 | | |
| DE | 102012217363 A1 * | 4/2014 | | H02K 21/24 |
| DE | 102012217363 A1 | 4/2014 | | |
| FR | 2930690 A1 * | 10/2009 | | |
| JP | 55029248 A * | 3/1980 | | |
| WO | 2015173734 A | 11/2015 | | |
| WO | WO-2016035358 A1 * | 3/2016 | | H02K 1/274 |
| WO | 2017173188 A1 | 10/2017 | | |
| WO | 2017194352 A1 | 11/2017 | | |

OTHER PUBLICATIONS

Machine Translation JP55029248 (Year: 1980).*
Machine Translation FR2930690 (Year: 2009).*
Machine Translation DE102012217363 (Year: 2012).*
Machine Translation WO2016035358 (Year: 2016).*
Extended Search Report for Application No. 19151485.0 dated Jun. 28, 2019; 10 pages.
Communication from the European Patent Office for European Application No. 19151485.0; dated Apr. 21, 2020; 4 Pages.

* cited by examiner

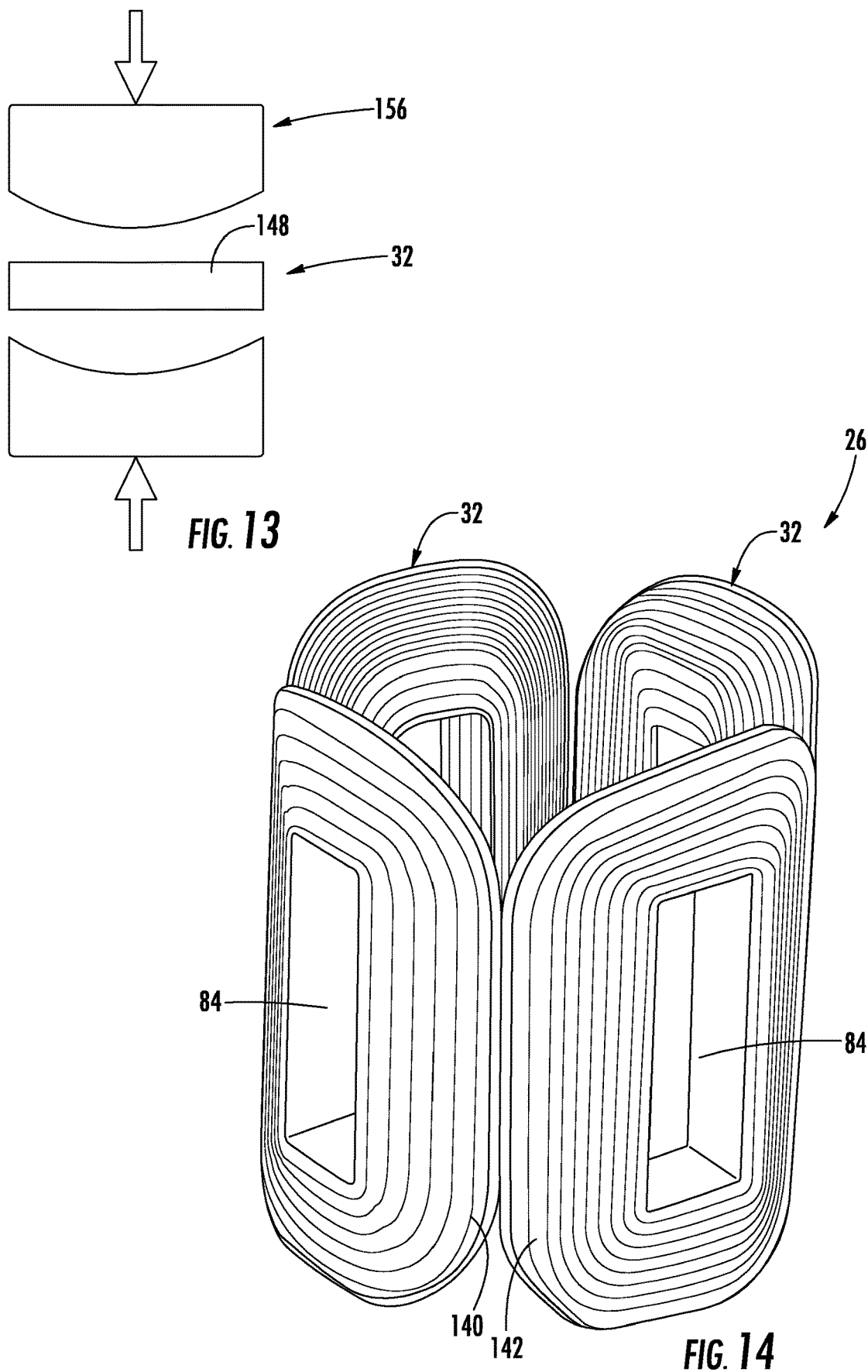

DUAL ROTOR, CORELESS, ELECTROMAGNETIC MACHINE

CROSS-REFERENCE TO RELATED APPLICATIONS

This application claims the benefit of U.S. Provisional Application No. 62/616,496 filed Jan. 12, 2018, which is incorporated herein by reference in its entirety.

BACKGROUND

The present disclosure relates to electromagnetic machines, and more particularly to a dual rotor, coreless, electromagnetic machines.

Designing electromagnetic machines, such as electric motors, often requires standardizing some dimensions while allowing the motor to vary in other respects to cover an entire range of operating requirements. In one example and for a family of motors each providing different operating characteristics, an outer diameter of the motor may be consistent, while the motor axial length (i.e., packaging length) is changed to accommodate different windings. Improvements in motor design techniques that may lead to improvements in motor efficiency, motor cooling, reduction in costs, and standardization of parts and packaging is desirable.

SUMMARY

A coreless electromagnetic machine according to one, non-limiting, embodiment of the present disclosure includes a dual rotor adapted to rotate about an axis, the dual rotor including inner and outer rotor segments, wherein the outer rotor segment is spaced radially outward from and axially aligned to the inner rotor segment, and the inner and outer rotor segments radially define an annular chamber; and a stator disposed at least in-part in the annular chamber.

Additionally to the foregoing embodiment, the coreless electromagnetic machine is a coreless electric motor.

In the alternative or additionally thereto, in the foregoing embodiment, each one of the first and second rotor segments include a plurality of permanent magnets.

In the alternative or additionally thereto, in the foregoing embodiment, the plurality of permanent magnets are sintered magnets.

In the alternative or additionally thereto, in the foregoing embodiment, the plurality of permanent magnets are molded magnets.

In the alternative or additionally thereto, in the foregoing embodiment, the outer rotor segment and the stator radially define an annular outer gap as part of the annular chamber, and the inner rotor segment and the stator radially define an annular inner gap as part of the annular chamber.

In the alternative or additionally thereto, in the foregoing embodiment, the stator includes a plurality of electric coils each including an inner winding layer wound about and spaced from a centerline that generally intersects the axis, and the inner winding layer defining an opening for the flow of cooling air between the annular inner and outer gaps.

In the alternative or additionally thereto, in the foregoing embodiment, each one of the plurality of electric coils include a plurality of mid-winding layers disposed radially from the inner winding layer, and an outer winding layer disposed radially outward from the plurality of mid-winding layers with respect to the centerline.

In the alternative or additionally thereto, in the foregoing embodiment, the stator includes a bonding material for securing the plurality of electric coils together.

In the alternative or additionally thereto, in the foregoing embodiment, the bonding material is molded to the plurality of electric coils.

In the alternative or additionally thereto, in the foregoing embodiment, the stator include a support structure, a plurality of bobbins detachably fitted to the support structure, and a plurality of electric coils with each one wound about a respective bobbin of the plurality of bobbins.

In the alternative or additionally thereto, in the foregoing embodiment, each bobbin of the plurality of bobbins define an opening for the flow of cooling air radially between the annular inner and outer gaps.

In the alternative or additionally thereto, in the foregoing embodiment, the cordless electromagnetic machine includes a motor drive disposed in an inner cavity axially aligned to and defined by the inner rotor segment, wherein the inner rotor segment is radially disposed between the inner cavity and the annular chamber.

In the alternative or additionally thereto, in the foregoing embodiment, the motor drive includes a circuit board electrically connected to each one of the plurality of electric coils.

A coreless electric motor according to another, non-limiting, embodiment includes a dual rotor adapted to rotate about an axis, the dual rotor including inner and outer rotor segments each including a plurality of permanent magnets, wherein the outer rotor segment is spaced radially outward from and axially aligned to the inner rotor segment, and the inner and outer rotor segments radially define an annular chamber; a stator disposed at least in-part in the annular chamber, and including a plurality of electric coils; and a motor drive electrically connected to each one of the plurality of electric coils.

Additionally to the foregoing embodiment, the inner rotor segment radially defines an inner cavity for the flow of cooling air.

In the alternative or additionally thereto, in the foregoing embodiment, the motor drive is disposed in the inner cavity, and the inner rotor segment is disposed radially between the annular chamber and the inner cavity.

In the alternative or additionally thereto, in the foregoing embodiment, the inner rotor segment defines a plurality of openings for the radial flow of cooling air from the inner cavity to the annular chamber.

In the alternative or additionally thereto, in the foregoing embodiment, the stator defines a plurality of openings for the radially outward flow of cooling air within the annular chamber.

In the alternative or additionally thereto, in the foregoing embodiment, the motor drive includes a circuit board as an integrated structural component of the stator.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 13 is a schematic of a press used to bend the electric coil;

FIG. 14 is a perspective view of the stator utilizing the coils of FIG. 11; and

DETAILED DESCRIPTION

Figure 1:
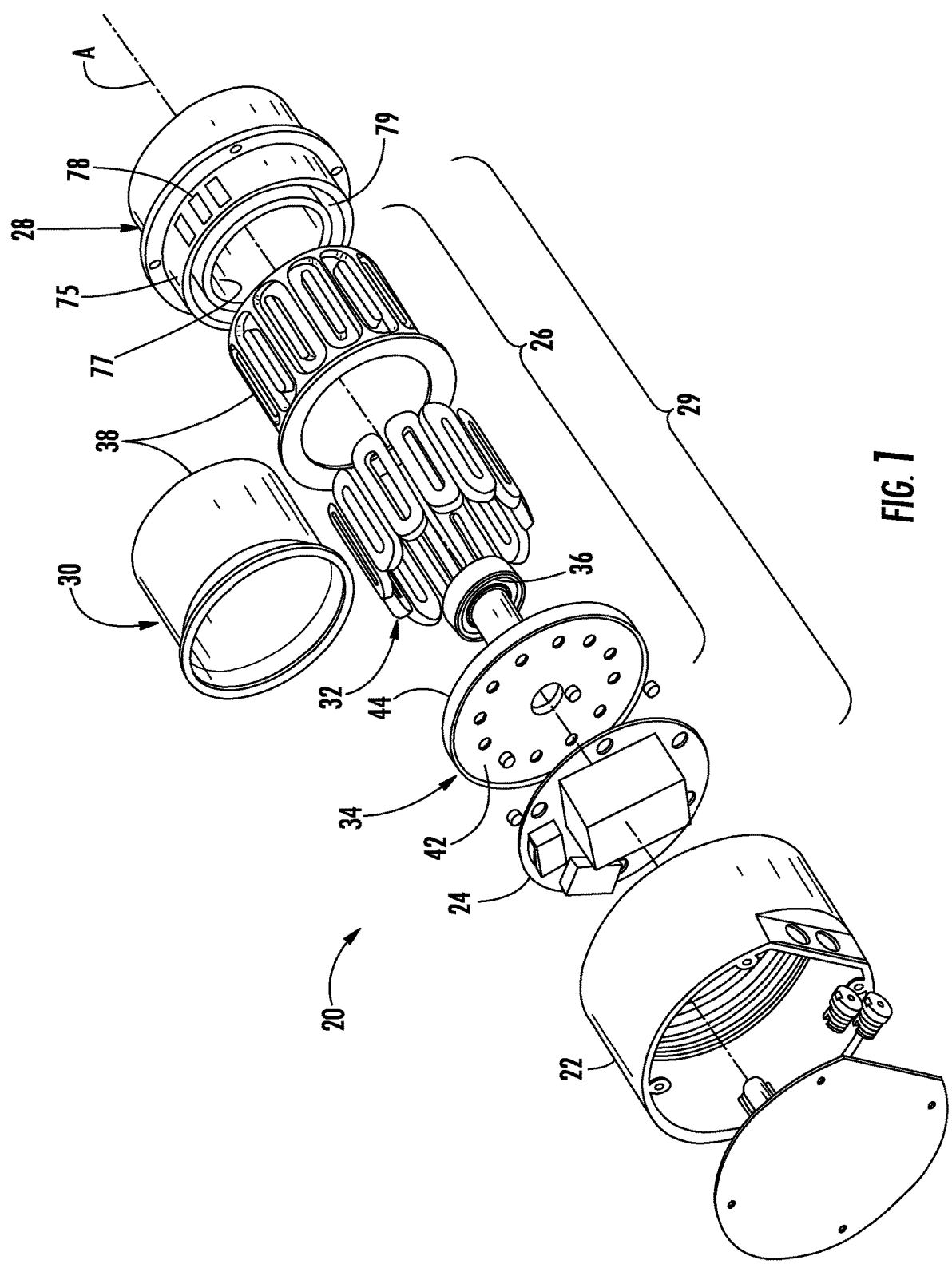
FIG. 1 is an disassembled, expanded, perspective view of an electromagnetic machine as one non-limiting, exemplary embodiment of the present disclosure.

Referring to FIG. 1, an electromagnetic machine 20 adapted to convert electrical energy to mechanical energy, or vice-versa, is illustrated. Examples of the electromagnetic machine 20 may include an electric motor and a generator. The electromagnetic machine 20 may include a housing 22, a motor drive 24, a stator 26, and a rotor 28. The housing 22 is adapted to house the circuit board 24, the stator 26, and the rotor 28. The circuit board 24 may be attached to the stator 26. As is generally known in the art of electric motors, the stator 26 and the rotor 28 are axially aligned to one-another and are generally centered about a rotation axis A. The stator 26 may be stationary, and the rotor 28 is adapted to rotate about the rotation axis A. Together, the circuit board 24 and the stator 26 may be identified as a stator assembly 29. In one example, the electromagnetic machine 20 may be coreless. In another, non-limiting, example, the motor drive 24 may be, or may include, a circuit board that may be printed.

Universal Stator:

The stator 26 may include a support structure assembly 30, and a plurality of coils 32. The support structure assembly 30 may include a mounting plate 34, bearings 36, a support structure 38, and a plurality of bobbins 40 (see FIG. 2). Each one of the plurality of coils 32 may be one about a respective one of the plurality of bobbins 40. The support structure 38 is adapted to support, and attach to, the plurality of bobbins 40. The mounting plate 34 may be adapted to support, and attach to, the support structure 38 and the bearings 36 for substantially frictionless rotation of the rotor 28 about the axis A. The motor drive 24 may attach to an axial side 42 of the mounting plate 34, and the support structure 38 may attach to an opposite axial side 44 of the mounting plate. In another embodiment, the mounting plate 34 may be an integral and unitary part of the support structure 38. In another embodiment, the mounting plate 34 may be an integral and unitary part of the motor drive 24 which may be a circuit board. In yet another embodiment, the stator 26 may not include the mounting plate 34, and instead, the motor drive 24 as a circuit board also functions as a structural member from the stator 26.

Figure 2:
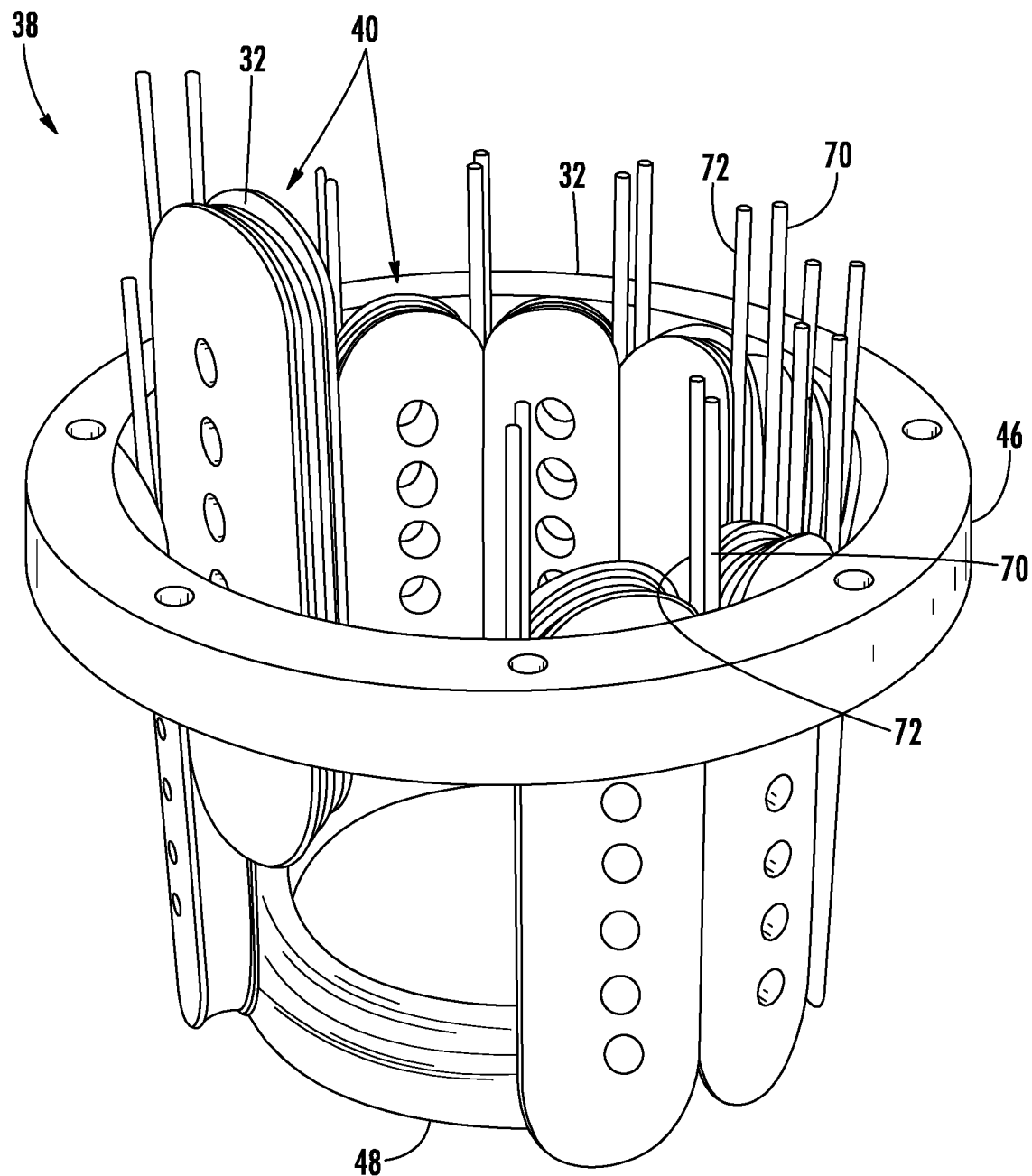
FIG. 2 is a perspective view of a stator of the electromagnetic machine.
Figure 3:
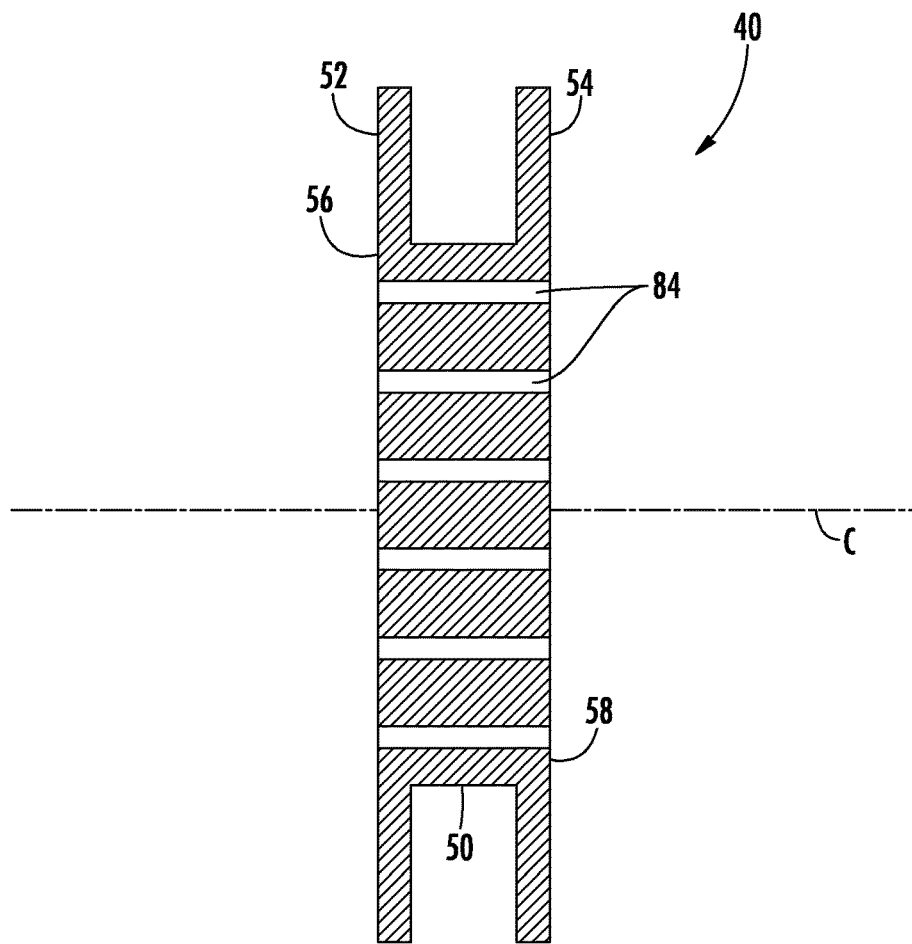
FIG. 3 is a cross section of a bobbin of the stator.

Referring to FIGS. 2 and 3, the plurality of bobbins 40 may generally be the same, with each including a core 50 extending along a centerline C and two opposite flanges 52, 54. The core 50 extends between and may form into the flanges 52, 54. The flanges 52, 54 may be substantially normal to the centerline C. When the electromagnetic machine 20 is fully assembled, each centerline C may be generally normal to, and intersects, the axis A, and the coils 32 are generally wound about the respective cores 50 and centerlines C. More specifically, each core 50 may extend in a radial direction with respect to axis A, such that the flange 52 is an outer flange, and the flange 54 is an inner flange located radially inward from the outer flange.

The support structure 38 may include at least one ring (i.e., two illustrated as 46, 48). Both rings 46, 48 may be centered about axis A, and may be axially spaced apart from one another. Each bobbin 40 may be axially elongated with respect to axis A, and may include opposite end portions 56, 58. When the support structure assembly 30 is assembled, the ring 46 may be an outer ring located radially outward from the plurality of bobbins 40, and the ring 48 may be an inner ring located radially inward from the bobbins 40. In one example and during manufacture, each coil 32 may be wound about a respective bobbin 40 prior to attaching the bobbins 40 to the rings 46, 48. Moreover, each bobbin 40 may be releasably attached to one, or both, of the rings 46, 48 (e.g., snap fitted) for easy removal to perform maintenance on any particular bobbin 40 and/or coil 32.

Figure 4:
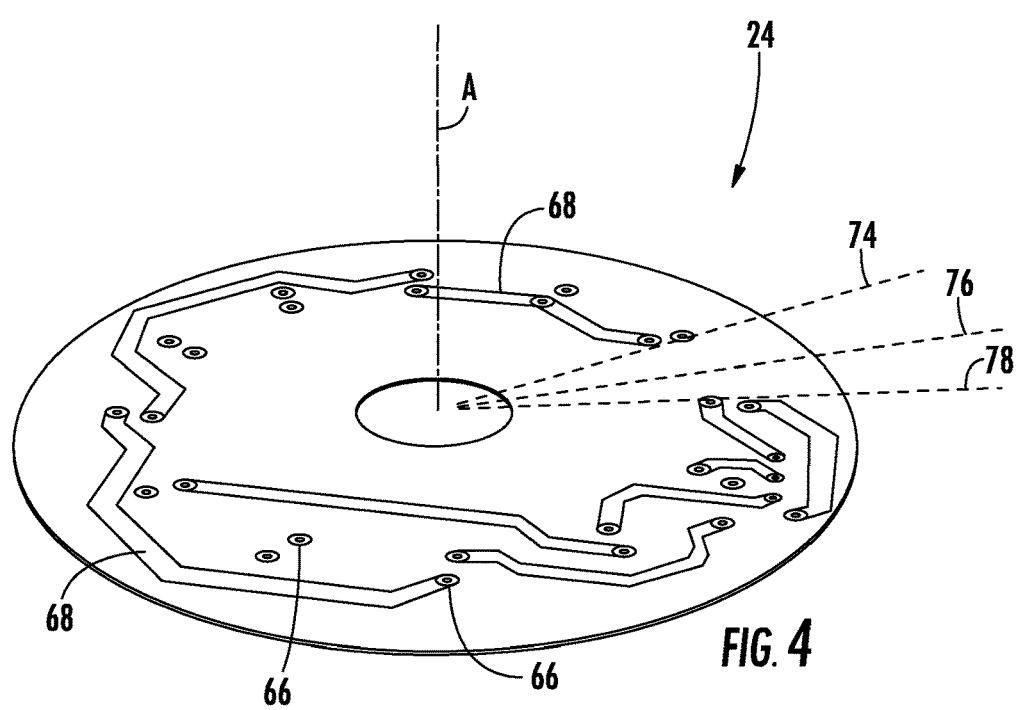
FIG. 4 is a perspective view of a circuit board of the electromagnetic machine.
Figure 5:
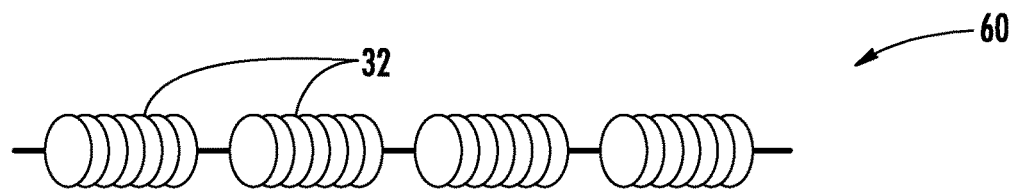
FIG. 5 is a schematic of a series coil configuration of the stator.
Figure 6:
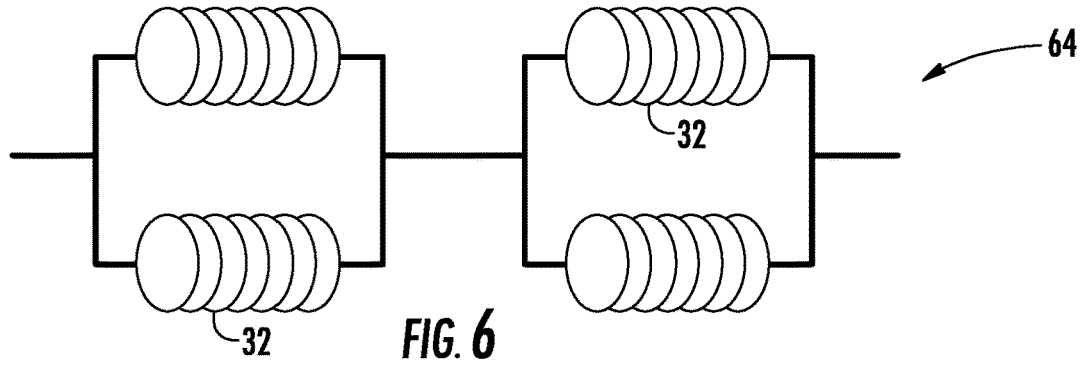
FIG. 6 is a schematic of a combination coil configuration of the stator.
Figure 7:
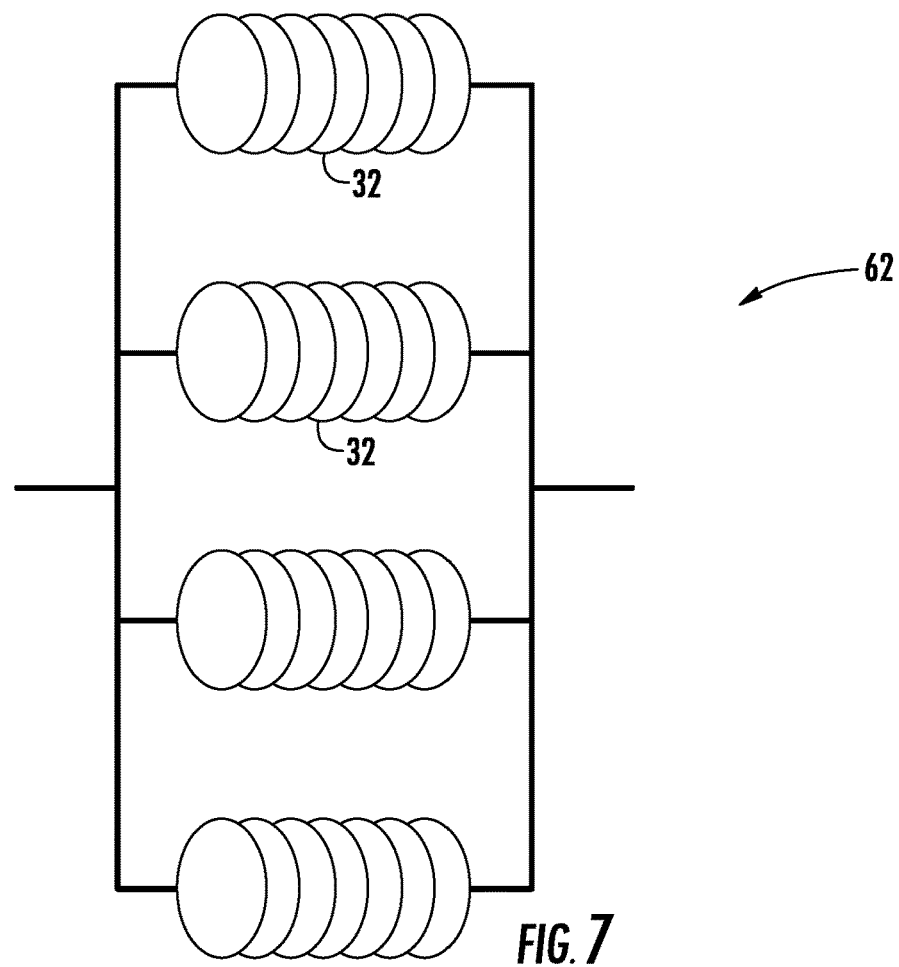
FIG. 7 is a schematic of a parallel coil configuration of the stator.

Circuit Board with Multiple Coil Configuration Imprints:

Referring to FIG. 4, the motor drive 24 is generally illustrated as a circuit board that is substantially planar, circular and/or annular in shape, and substantially normal to axis A. The circuit board may be a printed circuit board, and is generally configured to wire the plurality of coils 32 in a predefined configuration to achieve, for example, the desired output torque, and/or speed, of the electromagnetic machine 20. That is, the motor drive 24, as a circuit board, may enable the use of universal components for multiple motor applications, by generally providing options on how the coils 32 are wired together (i.e., series, parallel, and combinations thereof). In one embodiment, the plurality of bobbins 40 may each be the same, and may be universal bobbins capable of being applied to a variety of motor applications with different output parameters. Similarly, the stator support structure assembly 30, and/or the support structure 38, may be universal, capable of being applied to a variety of motor applications utilizing the universal bobbins 40 and/or universal coils 32.

Referring to FIGS. 4 through 7, the plurality of coils 32 (i.e., four illustrated), may have a coil configuration 60 where the coils 32 are electrically wired in series to one another (see FIG. 5), may have a coil configuration 62 where the coils 32 are electrically wired in parallel to one another (see FIG. 7), or may have a coil configuration 64 where the coils 32 are electrically wired in a combination of both parallel and series arrangements. The output of the motor torque and speed may be different depending upon the coil configuration 60, 62, 64 applied.

The motor drive 24 as a circuit board provides an easy and efficient means of choosing the desired coil configuration 60, 62, 64. For example, the circuit board may include a plurality of connection points 66 (e.g., through-hole pads) and zero resistance jumpers, or printed tracers, 68 arranged to provide, for example, three individual coil configuration imprints (i.e., one illustrated in FIG. 4), with each footprint associated with a respective coil configuration 60, 62, 64.

As best shown in FIG. 2, the universal coils 32 may each include positive and negative leads 70, 72, each projecting in a common axial direction with respect to axis A. In general, lead 70 may be spaced radially outward from lead 72, and by a common radial distance for each coil 32. The leads 70, 72 may also be circumferentially spaced, by a common circumferential distance, from the leads 70, 72 of the circumferentially adjacent coil 32. In one embodiment, the leads 70, 72 of the coils 32, may project axially through the mounting plate 32, and through the aligned connection points 66 for electrical connection to the associated jumpers 68.

In one embodiment, the motor drive 24, as a circuit board, may generally include three mountable positions 74, 76, 78, with each mountable position associated with a respective coil configuration imprint. During manufacture, or assembly, simply rotating the circuit board between the mountable positions 74, 76, 78 is the means of selecting the desired coil configuration 60, 62, 64. More specifically, if the plurality of coils is twelve coils, the number of connection points 66 for leads 70 may be three times the number of coils, which may be thirty-six connection points where only twelve are actually used. When used, the leads 70 may project axially through the respective through-hole pads 66 for soldering to the respective tracer 68. The same principle may apply for the leads 72. In another embodiment, the circuit board may include only one coil configuration imprint; however, to establish a desired motor type, the correct circuit board with the desired coil configuration imprint is chosen.

Figure 8:
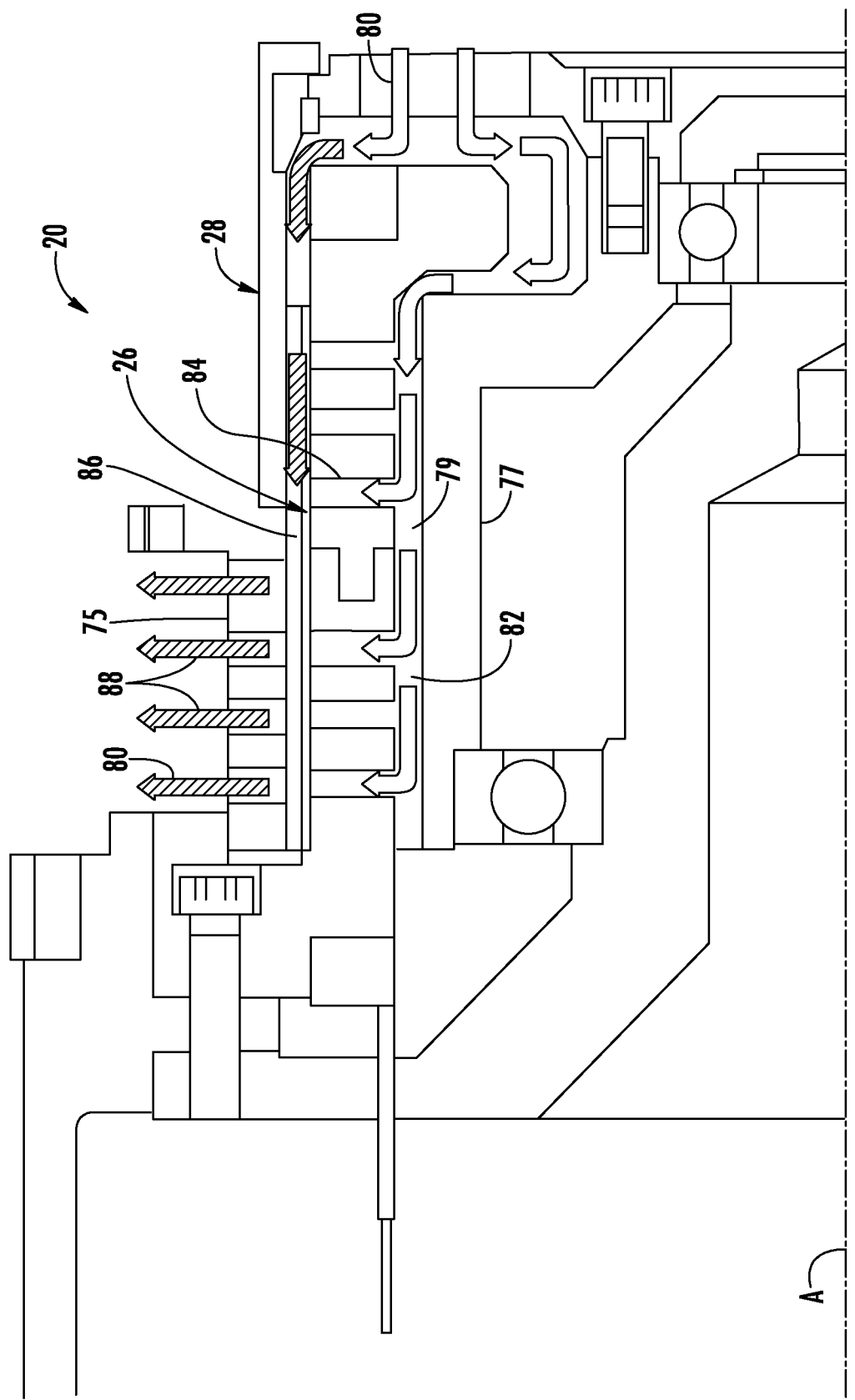
FIG. 8 is a partial cross section of the electromagnetic machine illustrating a flow path of cooling air.

Inner Cooled Dual Rotor:

Referring to FIGS. 1 and 8, the rotor 28 may be a dual rotor having an outer rotor segment 75 spaced radially outward from, and concentric too, an inner rotor segment 77. Each segment 75, 77 may include a plurality of permanent magnets 78 for interaction with the coils 32 as is generally known in the art of motors and generators. The outer and inner rotor segments 75, 77 may include boundaries that radially define an annular chamber 79. When the electromagnetic machine 20 is assembled, the outer rotor segment 75, the stator 26 is substantially in the annular chamber 79, the inner rotor segment 77 and the stator 26 (i.e., bobbins 40 and coils 32) are generally axially aligned to one another, and the stator 26 is generally spaced radially from and between the outer and inner rotor segments 75, 77.

To provide air cooling for the stator 26, cooling air (see arrows 80 in FIG. 8) may flow through various channels, spaces, and/or gaps provided in and between the stator 26 and the rotor 28. In one embodiment, the inner rotor segment 77 and the stator 26 may include boundaries that define a cooling flow gap 82 that may be substantially annular in shape, and is part of the annular chamber 79. The core 50 of each bobbin 40 may include at least one cooling flow opening 84 (e.g., hole, six illustrated in FIG. 3) that extend, or communicate, radially through the bobbin 40 with respect to axis A. The outer rotor segment 75 and the stator 26 may include boundaries that define a cooling flow gap 86 that may be substantially annular in shape, is part of the annular chamber 79, and is located radially outward from gap 82. In addition, the outer rotor segment 75 may include boundaries that define a plurality of openings 88 (e.g., holes) that extend, or communicate, radially through the outer rotor segment 75 with respect to axis A.

When the electromagnetic machine 20 (e.g., motor) is assembled, the gap 82 is in direct communication with the bobbin openings 84. The openings 84 communicate directly with, and between, the gaps 82, 86, and the gap 86 communicates directly with the outer rotor segment openings 88. In operation, cooling air 80 may flow axially through the gap 82, then radially outward through the bobbin openings 84. From the bobbin openings 84, the cooling air 80 may flow through the gap 86, then radially through the outer rotor segment openings 88.

Figure 9:
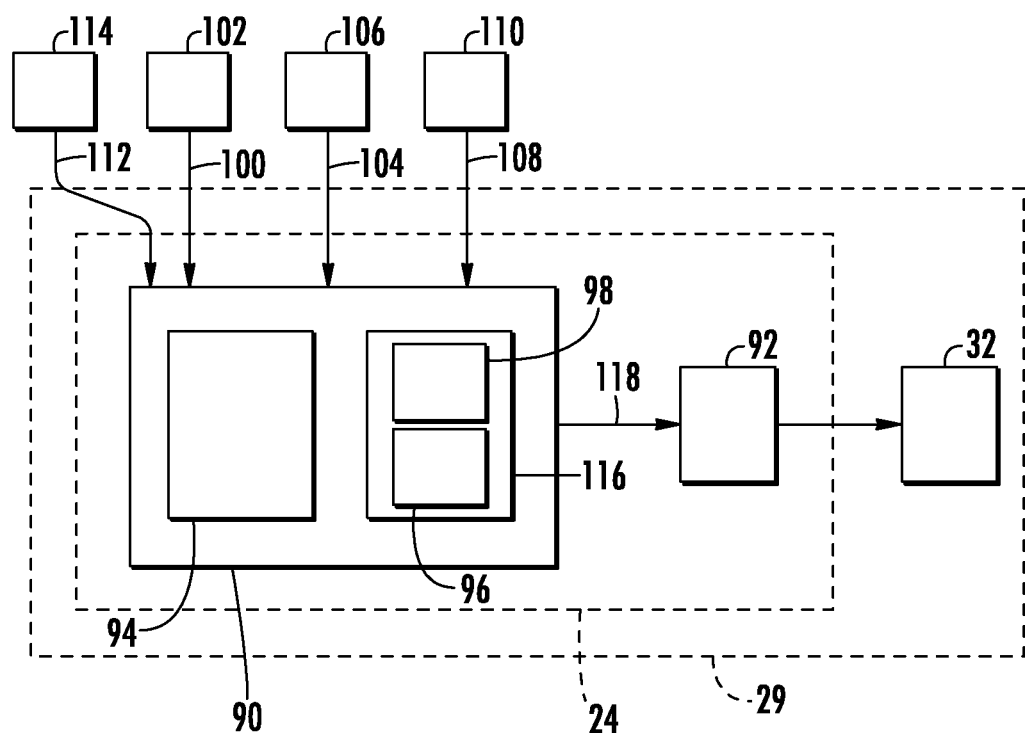
FIG. 9 is a schematic of another embodiment of a stator assembly including a controller as part of a circuit board.

Self-Adapting Motor Drive:

Referring to FIGS. 1 and 9, another embodiment of the motor drive 24 of the stator assembly 29 may include a controller 90 configured to select one of the coil configurations 60, 62, 64 based on sensory input. That is, the motor drive 24 may not include the multitude of configuration imprints previously described, and instead, may rely on the controller 90 to select the appropriate coil configuration to optimize operation of the electromagnetic machine 20. In this embodiment, each coil lead 70, 72 may still electrically connect to through-hole pads 66 as previously described in the example of the motor drive 24 being a circuit board; however, at least some of the zero-resistance jumpers, or tracers, may be routed directly to a switch 92 of the motor drive 24.

The controller 90 may include a processor 94 (e.g., microprocessor) and an electronic storage medium 96 that may be computer readable and writeable. A self-adapt logic module 98, which may be software-based, is stored in the electronic storage medium 96 and executed by the processor 94 for control of the switch 92. Depending upon the selected, or commanded, orientation of the switch 92, the plurality of electric coils 32 may be orientated in one of the configurations 60, 62, 64. Non-limiting examples of the switch 92 may include a simple, mechanical, switch, at least one transistor switch, and/or a multitude of micro-switches. The motor drive 24 may further include other electronic elements 95 (see FIG. 10) as is known by those skilled in the art of motor drives.

Referring to FIG. 9, the sensor inputs may include one or more of a temperature signal 100 generated by a temperature sensor 102, a power source input voltage signal 104 generated by a voltage sensor 106, a torque signal 108 generated by a torque sensor 110, a speed signal 112 generated by a speed sensor 114, and other sensory inputs.

The controller 90 may further include a database 116 that includes a plurality of pre-programmed values (e.g., set points) utilized by the self-adapt logic module 98. In operation, the module 98 of the controller 90 may process the power source voltage signal 104 from the voltage sensor 106, and based on the voltage, select an appropriate coil configuration to optimize performance based on a pre-programmed torque and/or speed requirement stored in the database 116.

Alternatively, or in addition to, the module 98 of the controller 90 may process the temperature signal 100 from the temperature sensor 102, which may be indicative of a stator temperature. The controller 90 may determine if, for example, the stator temperature is running high based on a high temperature set point stored in the database 116. If the stator temperature is high, the controller 90 may choose a coil configuration appropriate to reduce the stator temperature, while maintaining torque and speed requirements as much as feasible.

Alternatively, or in addition to, the module 98 of the controller 90 may process the torque signal 108 from the torque sensor 110. The torque signal 108 may, for example, be indicative of an output torque of the electromagnetic machine 20 (e.g., electric motor). This real-time output torque may be compared to a desired output torque pre-programmed into the database 116. If the actual output torque is too high, or too low, the module 98 may cause the controller 90 to send a command signal (see arrow 118) to the switch 92 to appropriately re-configure the coils 32 to achieve the desired torque. In one embodiment, the coil connections may be switched, thus the coil configuration changed, while the electromagnetic machine 20 (e.g., motor) is operating and the rotor 28 is rotating about rotation axis A.

Alternatively, or in addition to, the module 98 of the controller 90 may process the speed signal 112 from the speed sensor 114. The speed signal 112 may, for example, be indicative of an output speed (e.g., revolutions per minute) of the electromagnetic machine 20. This real-time output speed may be compared to a desired output speed pre-programmed into the database 116. If the actual output speed is too high, or too low, the module 98 may cause the controller 90 to send a command signal (see arrow 118) to the switch 92 to appropriately re-configure the coils 32 to achieve the desired speed.

Figure 10:
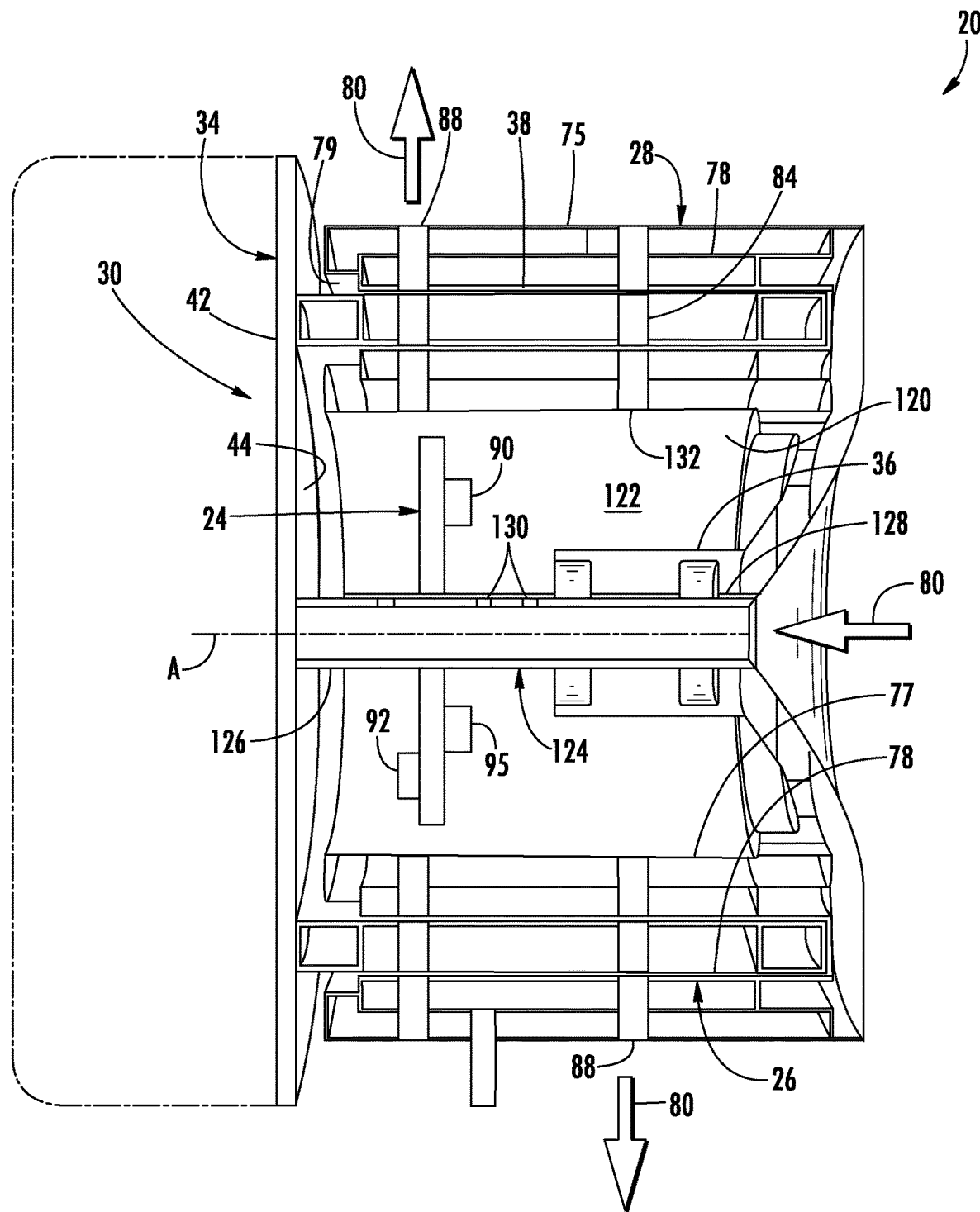
FIG. 10 is a cross section of another embodiment of the electromagnetic machine illustrated as an electric motor.

Integrated Motor Drive:

Referring to FIGS. 1 and 10, another embodiment of an electromagnetic machine 20 is illustrated as an electric motor. The rotor 28 may be the dual rotor embodiment having the inner rotor segment 77 that carries a circumferentially continuous face 120 that faces radially inward and includes boundaries that radially define an inner cavity 122. When the electromagnetic machine 20 is fully assembled, the inner rotor segment 77 is centered to axis A, the support structure 38 of the stator 26 is axially aligned to, and spaced radially outward from the inner rotor segment 77, and the outer rotor segment 75 is axially aligned to, and spaced radially outward from the stator support structure 38.

The support structure assembly 30 of the electromagnetic machine 20 may further include a stationary shaft 124 that is centered to axis A, located in the inner cavity 122, generally axially aligned to the stator 26 and rotor 28, and is spaced radially inward from the inner rotor segment 77. The stationary shaft 124 may include opposite end portions 126, 128 with the first end portion 126 engaged to the axial side 44 of the mount plate 34, and the opposite end portion 128 generally engaged to, or supporting, the bearings 36. The axial side 44 of the mount plate 34 may include boundaries that, at least in-part, axially defines the inner cavity 122.

In one embodiment, the motor drive 24 may be located completely in the inner cavity 122 to optimize motor packaging. As illustrated in FIG. 10, the motor drive 24 may be the example of a circuit board that is supported by the stationary shaft 124 between the opposite end portions 126, 128. In another embodiment, the motor drive 24 may be supported by the mount plate 34 with any one or more of the controller 90, switch 92, and other electronic elements 95 projecting from the mount plate 34 and into the inner cavity 122. For purposes of this embodiment, the term 'electronic elements' may include the controller 90 and the switch 92.

In one embodiment, the stationary shaft 124 may be hollow having at least one open end for the axial flow of the cooling air 80. In one example, the hollow shaft 124 may communicate through the mount plate 34 of the support structure assembly 30. In another embodiment, the mount plate 34 may be closed off at the end proximate to the mount plate 34 promoting further cooling air flow into the inner cavity 122.

In one embodiment, the mount plate 34 and/or the stationary shaft 124 may be metallic to promote cooling of the motor drive 24 in the inner cavity 122 via convection (i.e., heat sinks). In another embodiment, the hollow, stationary, shaft 124 may include boundaries that define at least one opening 130 (e.g., hole) for the radially outward flow of the cooling air 80 from the hollow shaft 124, and into the inner cavity 122. Similarly, the inner rotor segment 77, the stator support structure 38, and the outer rotor segment 75 may each include a respective plurality of openings 132, 84, 88 (e.g., holes, also see FIG. 8) for the radially outward flow of cooling air 80. When the electromagnetic machine 20 is assembled, the inner cavity 122 is in fluid communication radially between the openings 130, 132, the opening(s) 132 is in fluid communication radially between the inner cavity 122 and the opening(s)

When the electromagnetic machine 20 is fully assembled, a rotating output shaft of the electromagnetic machine 20 may drive a motor fan as is known by one having skill in the art (not shown). The fan may drive the air axially and radially outward through the inner cavity 122. In this way, the cooling air 80 may cool the motor drive 24 and the stator 26.

Figure 11:
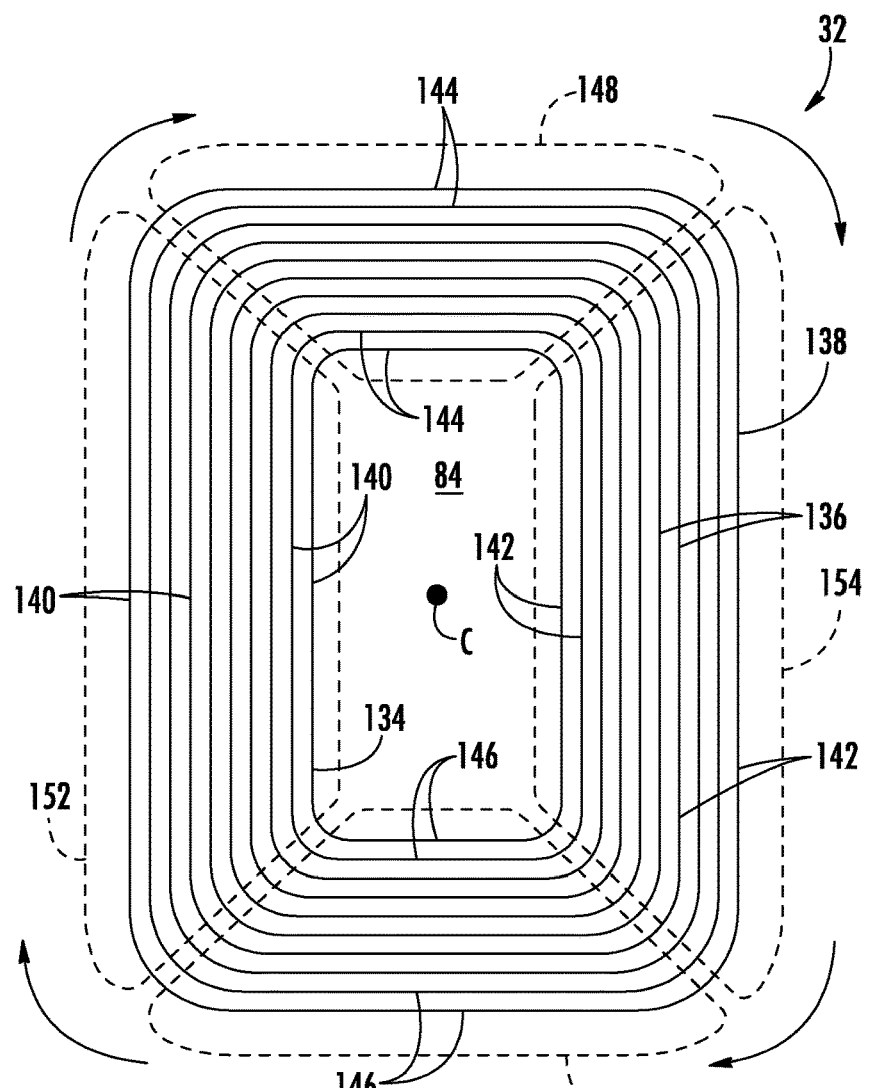
FIG. 11 is a side view of another embodiment of an electric coil of a stator.

Molded, Bobbin-less, Stator:

Referring to FIGS. 11 through 14, another embodiment of the stator 26 is illustrated along with a method of manufacture. The support structure assembly 30 of the present embodiment may not include the plurality of bobbins 40 previously described, and the support structure 38 may not include the rings 46, 48. As best shown in FIG. 11, each electric coil 32 may include an inner winding layer 134, a plurality of mid-winding layers 136, and an outer winding layer 138, each electrically interconnected to form the coil 32. The inner winding layer 134 is wound about, and radially spaced from, the centerline C, and includes boundaries that define the cooling opening 84. The mid-winding layers 136 are located radially outward from the inner winding layer 134 with respect to centerline C, with each successive mid-winding layer located radially outward from the adjacent mid-winding layer. The outer winding layer 138 is located radially outward from the mid-winding layers 136, and generally represents an outer periphery of the coil 32.

Figure 12:
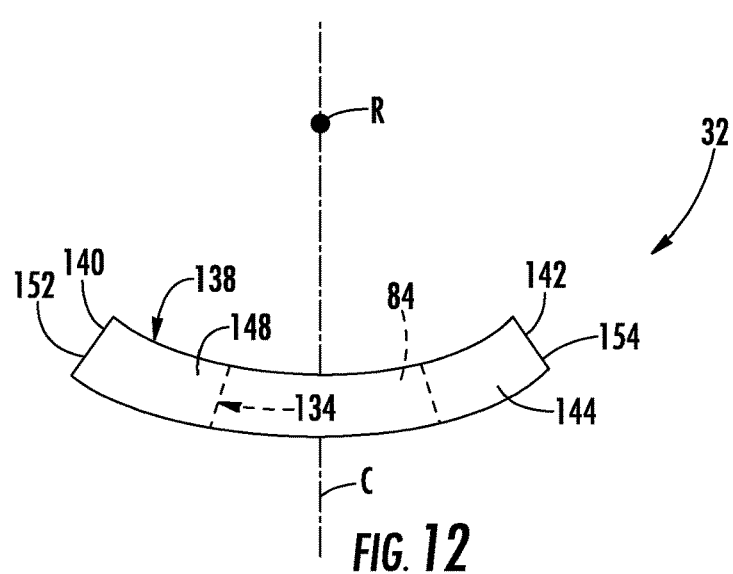
FIG. 12 is a top view of the electric coil in FIG. 11.

Referring to FIGS. 11 and 12, generally, each of the winding layers 134, 136, 138 may include diametrically opposite axial segments 140, 142, and diametrically opposite circumferential segments 144, 146. The axial segment 140 extends between, and is formed into, first ends of the respective circumferential segments 144, 146, and the axial segment 142 extends between, and is formed into, opposite second ends of the respective circumferential segments 144, 146. When the stator 26 is assembled, the axial segments 140, 142 may each substantially extend axially with respect to the rotation axis A, and the circumferential segments 144, 146 may be arcuate, each extending circumferentially with respect to the rotation axis A.

The coil 32 may be further described having diametrically opposite portions 148, 150 that may be substantially arcuate, and diametrically opposite portion 152, 154 that may be substantially linear, or straight. Arcuate portion 148 may extend between, and generally forms into ends of the respective straight portions 152, 154, and the arcuate portion 150 may extend between, and generally forms into opposite ends of the respective straight portion 152, 154. Each portion 148, 150, 152, 154 may include a respective plurality of the segments 144, 146, 140, 142. In another example, the coil 32 may be substantially circular or oval, thus the portions 152, 154 may not be straight. Examples of a winding material, or shape, may be electrically conductive, profiled, wire, and tapes or ribbons that increase fill factors.

During manufacturing, each coil 32 may be wound about the centerline C, separately, and generally within a plane. That is, the portions 148, 150 may initially be straight or flat, and without an arcuate shape. The wound coil 32 may then be bent to provide the arcuate shape of the portions 148, 150. Referring to FIG. 13, and in one example, the un-bent coil 32 may be placed into a press, or similar tool, 156 to obtain the arcuate shape.

Referring to FIGS. 11 and 14, with the coils 32 fully formed, or shaped, each coil 32 may be circumferentially placed about the rotation axis A. When properly positioned, the axial segment 142 of a first coil 32 is located proximate to the axial segment 140 of a circumferentially adjacent second coil 32. The coils 32 may then be secured to one-another utilizing a bonding material 158 while preserving the cooling openings 84.

In one embodiment, the bonding material 158 may be applied while the coils 32 are properly orientated within a mold (not shown). Such a mold may support an injection molding process. Examples of the bonding material 158 may be an adhesive, thermoplastic, injection molding plastic, or other materials having electrically insulating properties.

Advantages and benefits generally specific to the molded stator may include the allowance of a reduced radial thickness of the stator, smaller air gaps, an increase in space that can be used for the coil, enabling the use of less expensive magnets as ferrites, enables direct cooling of coils, and a reduction in material costs with respect to the stator.

Dual Rotor, Coreless, Electromagnetic Machine Architecture:

The electromagnetic machine 20 may be coreless, and may include the dual rotor 28. The novel architecture of the electromagnetic machine 20, as previously described, provides a structural solution for a wide range of applications including, but not limited to, a fan driving motor family covering different voltage inputs, shaft power, torque, and RPM. The architecture may be designed as an external rotor solution or a shaft driven solution.

The architecture may generally be of a modular design that simplifies manufacturing and maintenance. The electromagnetic machine architecture may utilize sintered magnets, or molded rotor structures. The architecture may further include back iron, or may benefit from a permanent magnet Halbach array arrangement, and use such as a structural component of the electromagnetic machine 20.

Figure 15:
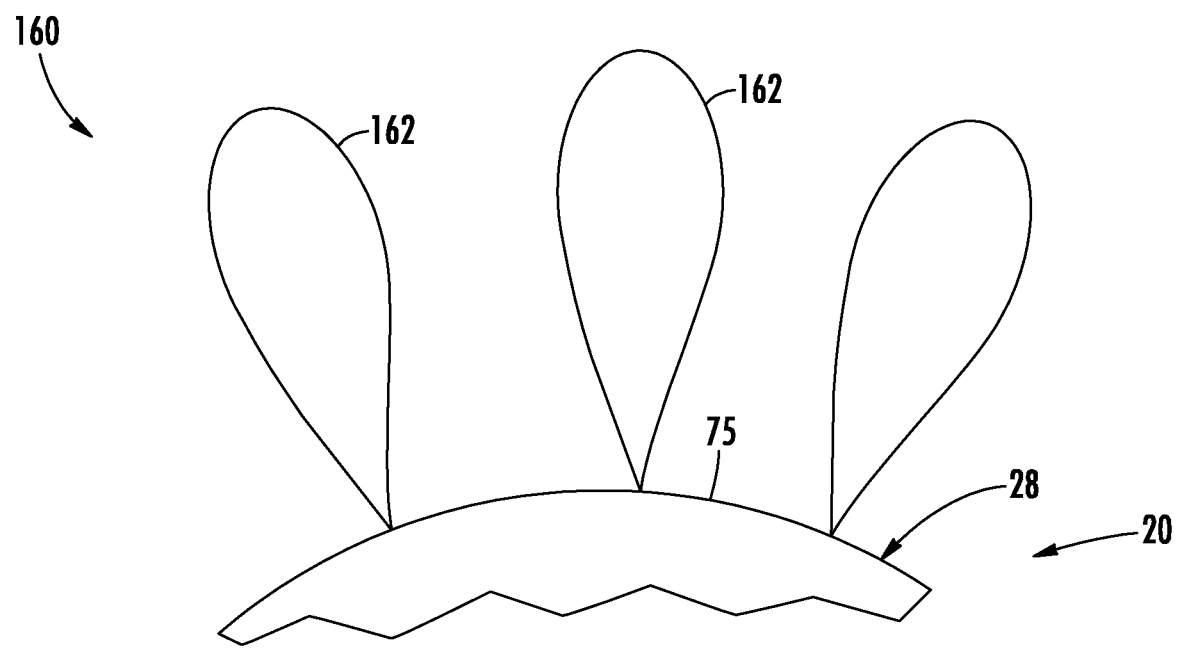
FIG. 15 is a partial end view of a fan assembly utilizing the electric motor.

Referring to FIG. 15, an example of an external rotor solution is illustrated as a fan assembly 160 that includes the electromagnetic machine 20 as an electric motor, and a plurality of air foils, or blades, 162 projecting radially outward from the outer rotor segment 75 of the dual rotor 28.

Advantage and benefits regarding the electromagnetic machine architecture include scalability to achieve desired torque and/or speed, a lack of cogging torque, a lack of core losses, less load on bearings, extended life, and the modular design. Another advantage is a negligible magnetic pull forces thus a simplified support structure, low sensitivity to rotor imbalance, and/or rotor-to-stator misalignment.

Other general advantages and benefits of the present disclosure include a reduction in design and manufacturing costs, a single coil winding type for an entire family of motors, coil connections conducted on a circuit board, utilization of a circuit board as part of a structural member, optimized motor packaging, and improved stator and motor drive cooling. Other advantages include the ability to wind the coils individually, or separately, on a rotary winding machine during manufacture to achieve higher fill factors, and the use of bobbin mounting rings or clips for quick assembly of the stator. Yet another advantage is the ability to change coil configurations dynamically to meet, for example, the currently required speed of a fan to optimize the motor performance.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A coreless electromagnetic machine comprising:
a dual rotor adapted to rotate about an axis, the dual rotor including inner and outer rotor segments, wherein the outer rotor segment is spaced radially outward from and axially aligned to the inner rotor segment, and the inner and outer rotor segments radially define an annular chamber; and
a stator disposed at least in-part in the annular chamber, wherein the coreless electromagnetic machine is a coreless electric motor, wherein each one of the first and second rotor segments include a plurality of permanent magnets, and wherein the stator includes a plurality of electric coils each including an inner winding layer wound about and spaced from a centerline that generally intersects the axis, and the inner winding layer defining an opening for the flow of cooling air between the annular inner and outer gaps.

2. The coreless electromagnetic machine set forth in claim 1, wherein the plurality of permanent magnets are sintered magnets.

3. The coreless electromagnetic machine set forth in claim 1, wherein the plurality of permanent magnets are molded magnets.

4. The coreless electromagnetic machine set forth in claim 1, wherein the outer rotor segment and the stator radially define an annular outer gap as part of the annular chamber, and the inner rotor segment and the stator radially define an annular inner gap as part of the annular chamber.

5. The coreless electromagnetic machine set forth in claim 1, wherein each one of the plurality of electric coils include a plurality of mid-winding layers disposed radially from the inner winding layer, and an outer winding layer disposed radially outward from the plurality of mid-winding layers with respect to the centerline.

6. The coreless electromagnetic machine set forth in claim 1, wherein the stator includes a bonding material for securing the plurality of electric coils together.

7. The coreless electromagnetic machine set forth in claim 6, wherein the bonding material is molded to the plurality of electric coils.

8. The coreless electromagnetic machine set forth in claim 4, wherein the stator includes a support structure, a plurality of bobbins detachably fitted to the support structure, and a plurality of electric coils with each one wound about a respective bobbin of the plurality of bobbins.

9. The coreless electromagnetic machine set forth in claim 8, wherein each bobbin of the plurality of bobbins define an opening for the flow of cooling air radially between the annular inner and outer gaps.

10. A coreless electromagnetic machine comprising:
a dual rotor adapted to rotate about an axis, the dual rotor including inner and outer rotor segments, wherein the outer rotor segment is spaced radially outward from and axially aligned to the inner rotor segment, and the inner and outer rotor segments radially define an annular chamber;
a stator disposed at least in-part in the annular chamber, wherein the coreless electromagnetic machine is a coreless electric motor, wherein the stator includes a plurality of electric coils each including an inner winding layer wound about and spaced from a centerline that generally intersects the axis, and the inner winding layer defining an opening for the flow of cooling air between the annular inner and outer gaps; and
a motor drive disposed in an inner cavity axially aligned to and defined by the inner rotor segment, wherein the inner rotor segment is radially disposed between the inner cavity and the annular chamber.

11. The coreless electromagnetic machine set forth in claim 10, wherein the motor drive includes a circuit board electrically connected to each one of the plurality of electric coils.

12. A coreless electric motor comprising:
a dual rotor adapted to rotate about an axis, the dual rotor including inner and outer rotor segments each including a plurality of permanent magnets, wherein the outer rotor segment is spaced radially outward from and axially aligned to the inner rotor segment, and the inner and outer rotor segments radially define an annular chamber;
a stator disposed at least in-part in the annular chamber, and including a plurality of electric coils, wherein the plurality of electric coils each include an inner winding layer wound about and spaced from a centerline that generally intersects the axis, and the inner winding layer defining an opening for the flow of cooling air between the annular inner and outer gaps; and
a motor drive electrically connected to each one of the plurality of electric coils.

13. The coreless electric motor set forth in claim 12, wherein the inner rotor segment radially defines an inner cavity for the flow of cooling air.

14. The coreless electric motor set forth in claim 13, wherein the motor drive is disposed in the inner cavity, and the inner rotor segment is disposed radially between the annular chamber and the inner cavity.

15. The coreless electric motor set forth in claim 14, wherein the inner rotor segment defines a plurality of openings for the radial flow of cooling air from the inner cavity to the annular chamber.

16. The coreless electric motor set forth in claim 12, wherein the motor drive includes a circuit board as an integrated structural component of the stator.

* * * * *